(12) United States Patent
Rötzer

(10) Patent No.: US 10,713,449 B2
(45) Date of Patent: Jul. 14, 2020

(54) ANTENNA MODULE FOR A RFID READER

(71) Applicant: Elatec GmbH, Puchheim (DE)

(72) Inventor: Christian Rötzer, Munich (DE)

(73) Assignee: Elatec GmbH, Puchheim (DE)

( * ) Notice: Subject to any disclaimer, the term of this patent is extended or adjusted under 35 U.S.C. 154(b) by 0 days.

(21) Appl. No.: 16/162,861

(22) Filed: Oct. 17, 2018

(65) Prior Publication Data

US 2019/0114452 A1    Apr. 18, 2019

(30) Foreign Application Priority Data

Oct. 18, 2017  (DE) .......................... 10 2017 218 623

(51) Int. Cl.
  *G08B 13/14*    (2006.01)
  *G06K 7/10*    (2006.01)
(52) U.S. Cl.
  CPC ..... *G06K 7/10237* (2013.01); *G06K 7/10316* (2013.01); *G06K 7/10346* (2013.01); *G06K 7/10356* (2013.01)
(58) Field of Classification Search
  CPC ........... G06K 7/10237; G06K 7/10356; G06K 7/10346; H01M 12/08; H01M 4/9016; H01M 4/382; H01M 4/9083; H01M 2300/0085; H01M 2300/0037; H01M 2300/0025; H01M 4/926; Y02E 60/128; Y02E 60/50; H02J 50/12; H02J 50/10; H02J 7/025; H01F 27/2823; H01F 27/2804; H01F 38/14
  USPC ............................................ 340/572.1–592.9
  See application file for complete search history.

(56) References Cited

U.S. PATENT DOCUMENTS

| | | | | |
|---|---|---|---|---|
| 6,517,000 | B1* | 2/2003 | McAllister | G06K 7/10881 235/462.01 |
| 7,205,896 | B2* | 4/2007 | Wu | G08B 13/2471 340/572.1 |
| 8,490,883 | B2 | 7/2013 | Baxter | |
| 9,431,698 | B2* | 8/2016 | Yosui | H01Q 1/2216 |
| 2014/0312123 | A1* | 10/2014 | Lin | G06K 19/07754 235/492 |
| 2016/0351993 | A1* | 12/2016 | Strauss | H01Q 1/2216 |
| 2017/0040696 | A1* | 2/2017 | Peralta | H01F 38/14 |

* cited by examiner

*Primary Examiner* — Anh V La

(74) *Attorney, Agent, or Firm* — Wood Herron & Evans LLP

(57) ABSTRACT

An antenna module for a RFID reader is provided, the antenna module being configured for operation with a plurality of transceivers of different impedance. The RFID reader includes an antenna and at least two terminals, with the antenna being connectable via at least a first of the terminals along at least two different contact points. A switch may also be provided for enabling switching between the at least two contact points. A RFID reader and a method for assembling a RFID reader are also provided. The antenna module and associated RFID reader are advantageously configured for use with a number of different transceivers.

10 Claims, 2 Drawing Sheets

ANTENNA MODULE FOR A RFID READER

CROSS-REFERENCE TO RELATED APPLICATION

This application claims priority to German Patent Application No. 10 2017 218 623.3, filed Oct. 18, 2017. The above-mentioned patent application is incorporated herein by reference in its entirety.

TECHNICAL FIELD

The present invention relates to an antenna module for a RFID reader, wherein the antenna module is configured for operation with a plurality of transceivers of different impedance. The present invention also relates to a RFID reader, as well as a method for assembling a RFID reader.

BACKGROUND

So-called RFID transmission refers to contactless and automatic identification and localization of objects by radio waves in the near-field range. A transceiver equipped to send and receive data is thereby used. This transceiver can transmit data to a transponder using an antenna, whereby the radiated electromagnetic waves thereby supply the transponder with sufficient energy to send data back to the transceiver without requiring an additional energy source.

Adjusting the impedance between a transceiver and its antenna to ensure the most loss-free antenna-based transmission possible from the transceiver to the transponder and vice versa is known from the prior art.

U.S. Pat. No. 8,490,883 discloses a system having a RFID antenna configured to communicate with a RFID tag. This system further comprises an antenna tuner electrically coupled to the RFID antenna, which is thereby configured to adjust the inductance between the RFID antenna and the RFID tag.

It is desirable to further improve these conventional designs for antenna modules and RFID readers.

SUMMARY

One object of the present invention is to provide an improved antenna module for a RFID reader. In particular, an object of the present invention is providing an antenna module able to be universally operated with a plurality of different transceivers. This task is solved by the antenna module and RFID reader as described in detail below.

In one embodiment, an antenna module for a RFID reader is provided, with the antenna module being configured for operation with a plurality of transceivers of different impedance. The antenna module includes an antenna implemented as a loop, in particular a coil, and at least two terminals for a transceiver. The antenna is contactable via at least a first of the terminals at two different contact points which are spaced apart from each other on the antenna along the conductor loop of the antenna. A transceiver to be coupled is selectively connectable via the first terminal to one of the two contact points as a function of the impedance of the respective transceiver and/or the impedance of a RFID transponder to be read.

The antenna module thus enables the configuration of the antenna module to be so modifiable that depending on the transceiver utilized, the operating parameters can be set such that attenuation of a signal transmitted from the transceiver to the antenna and thus further on to a transponder is reduced, preferably minimized. The operating parameter is hereby in particular the impedance which is able to be adjusted by virtue of the connectable contact points. Preferably, being able to read out a plurality of RFID transponders of different frequency can thereby also be achieved. Moreover, the signal transmission between the transceiver and the antenna can thereby also be improved so that the antenna's bandwidth is increased and/or not distorted when sending and receiving.

"Contactable" in the sense of the invention described herein is defined as "is contacted" or "can be contacted."

In one aspect, a transceiver in the sense of the invention is defined as a combination of transmitter and receiver configured to transmit and/or receive data wirelessly via an antenna.

In another aspect, a transponder in the sense of the invention is defined as a communication device which draws the energy necessary to communicate and execute internal processes exclusively from a transceiver's electric and/or magnetic field.

In a further aspect, the antenna module further includes an impedance matching device which is connected to the two terminals on one side and connectable to a transceiver on another side. This arrangement thereby enables achieving the further reducing, preferably minimizing, of differences in impedance between the antenna and a transceiver which are unable to be equalized or sufficiently equalized by the two spaced contact points. Furthermore, attenuation of a signal transmitted from the transceiver to the antenna and thus further on to a transponder can thereby also be reduced, preferably minimized.

In yet another aspect, the antenna module includes a switch which enables switching between the at least two contact points. This arrangement thereby enables, depending on the impedance of the transceiver and the antenna, manually and/or automatically establishing a temporary connection from the transceiver to the antenna between the two contact points to adjust the impedance between the transceiver and the antenna.

In one aspect, all elements of the antenna module are arranged on a circuit board. This arrangement thereby enables achieving being able to predefine the parameters of all the antenna module elements and their interaction and thus an at least substantially predefined operation of the circuit board, in particular the antenna module, with respect to the parameters, in particular with respect to the impedance, of all the elements.

In another aspect, the circuit board further comprises a mounting site for a transceiver. This configuration thereby enables achieving different transceivers being attachable and/or connectable to the circuit board, and thus the antenna module, so that the antenna module can be operated independently of a predetermined type of transceiver. The various aspects described above of the antenna module can be combined in any combination or sub-combination to achieve the technical advantages associated with those features.

In another embodiment of the present invention, a RFID reader is provided, including an antenna module as set forth above and a transceiver connected to one of the at least two contact points.

In yet another embodiment of the present invention, a method for assembling a RFID reader is provided, including: (1) providing an antenna module; (2) providing a transceiver; (3) connecting the transceiver to the two terminals or the impedance matching device; and (4) contacting at least one of the two contact points. In one aspect, the contact is achieved by switching a switch. This arrangement thereby enables achieving automatic and/or manual setting of the signal transmission via the first or second contact point as a function of the transceiver utilized.

The features and advantages described with respect to the first embodiment of the invention also apply to the second and third embodiments of the invention and advantageous embodiment thereof and vice versa.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

Figure 1:
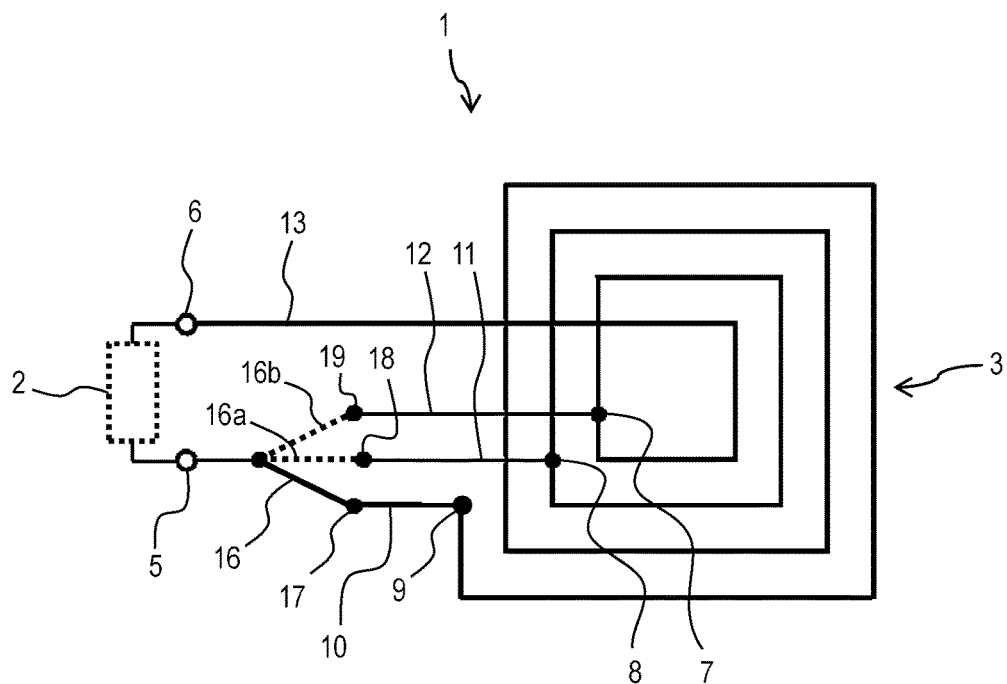
FIG. 1 is a schematic diagram of one embodiment of an antenna module according to the invention.

FIG. 1 shows one embodiment of an antenna module 1 according to the invention. The antenna module 1 is configured to be operated with different transceivers 2, in particular of different impedance. To that end, the antenna module 1 includes a first terminal 5 and a second terminal 6 which are electrically connected to an antenna 3. Antenna 3 is implemented as a loop, in particular a coil. A transceiver 2 can be connected to the antenna 3 via terminals 5, 6, as FIG. 2 depicts.

Figure 2:
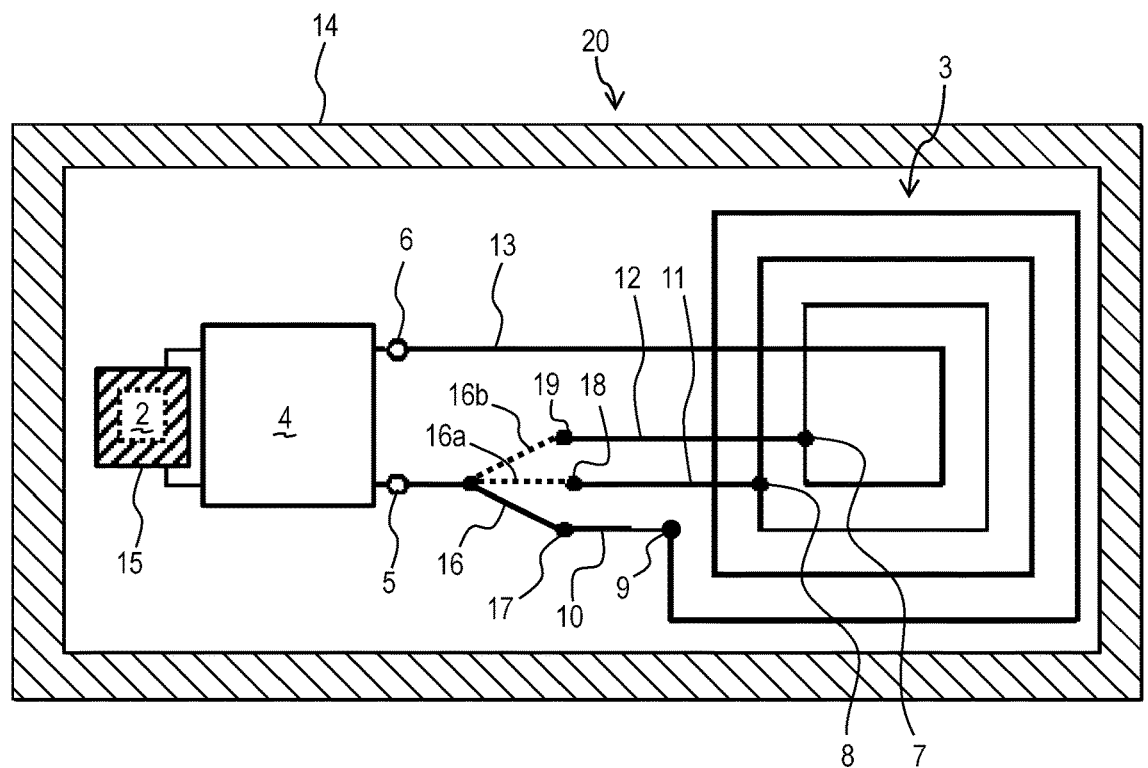
FIG. 2 is a schematic diagram of one embodiment of a RFID reader according to the invention.

In the representations provided in FIGS. 1 and 2, the antenna 3 can be connected to the first terminal 5 via a first, second or third connection point 17, 18, 19. The respective connection points 17, 18, 19 are preferably in turn connected via electrical lines to contact points 7, 8, 9 arranged at a spacing from one another on the loop of the antenna 3 along the antenna's conductor loop; i.e. in the antenna's longitudinal direction.

The second terminal 6 is preferably likewise connected to the other end of the antenna 3 by a fourth electrical line 13 or, in contrast to first terminal 5, connected directly thereto.

If the antenna 3 is designed as a coil, then contact points 7, 8, 9 define different numbers of the coil's windings n, n', n". The numbers of windings n, n', n" are preferably decimals, particularly non-integer numbers of windings may occur.

The transceiver 2 is electrically coupled to the antenna 3 via the first, second or third line 10, 11, 12 depending on the connection of the first terminal 5 to one of the three connection points 17, 18, 19.

Depending on how the connection 16, 16a, 16b is formed, the loop of the antenna 3 is accordingly changed such that an electrical circuit is formed by the transceiver 2 and the antenna 3, preferably via the first, second or third line 10, 11, 12 and a fourth line 13. The first line 10 thereby has the longest signal path or respectively the most windings n with respect to the coil in relation to the second and third line 11, 12 and the third line 12 has the shortest signal path or respectively the fewest windings n" with respect to the coil in relation to the first and second line 10, 11.

Due to these different signal paths and/or number of windings of the antenna 3 designed as a coil, the impedance of the antenna 3 is changed.

Preferably, the aggregate of first contact point 7, switchable connection 16, 16a, 16b and connection points 17, 18, 19 can be designed as a switch. The length of the loop and/or the number of windings n, n', n" of antenna 3 is then changed by different switch positions of connection 16, 16a, 16b. In so doing, the impedance of the antenna 3 can be selectively adjusted by the respective switch position selection.

The selection of the respective connection 16, 16a, 16b preferably takes into account the impedance of the antenna 3 as well as the induction of the respective transceiver 2. The signal strength of the antenna 3 is then highest when the impedance of the antenna 3 is matched to the impedance of the transceiver 2.

Alternatively or additionally, the selection can also be made from a transmission/receiving frequency of a RFID transponder to be read. This arrangement is advantageous because the impedance of the antenna 3 of the antenna module 1 changes at different frequencies. Accordingly, the loop length or number of windings n, n', n" should be adjusted upon a change in frequency so as to match the transceiver 2. Preferably, the bandwidth of the antenna 3 can thereby also be adapted.

FIG. 2 shows one embodiment of a RFID reader 20 according to the invention. In this depiction, all the elements of the antenna module 1 are arranged on a circuit board 14. Furthermore, the reader 20 preferably exhibits a mounting site 15 to which a transceiver 2 can be connected. A wide variety of transceivers 2 can be used at this mounting site. This makes for a flexible reader 20 since there is no restriction as to a preinstalled transceiver 2.

Preferably, the reader 20 comprises an optional impedance matching device 4 which is connected to the antenna 3 on the one side via the two terminals 5, 6 and connectable to a transceiver 2 on the other, preferably by way of the mounting site. The impedance matching device 4 can further reduce, in particular minimize, impedance differences between the transceiver 2 and the antenna 3 which were unable to be sufficiently reduced by the selection of a connection 16, 16a, 16b.

Figure 3:
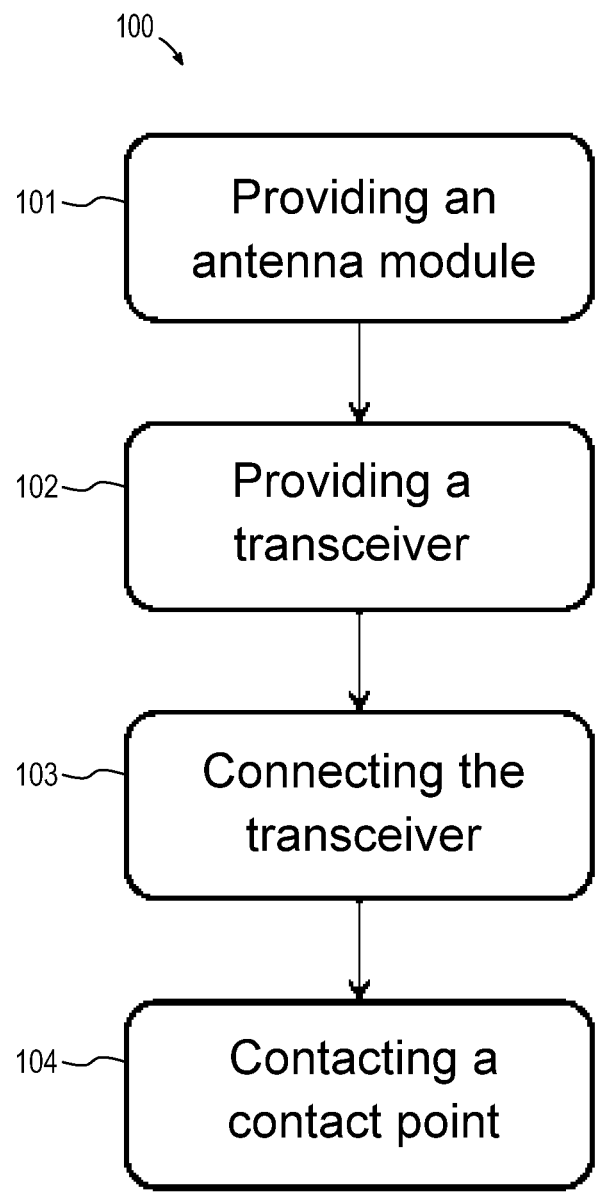
FIG. 3 is a flowchart showing steps of a method according to another embodiment of the invention for assembling a RFID reader.

FIG. 3 shows one embodiment of a method 100 for assembling a RFID reader 20 according to the invention. In a first step 101, an antenna module 1 is provided, which is in particular configured as described in detail above.

In a second step 102, a transceiver 2 is provided, which is able to be connected to an antenna 3 of the antenna module 1. The transceiver 2 processes data sent or received via the antenna 3.

In a further step 103, the transceiver 2 is connected to the two terminals 5, 6 or the impedance matching device 4. This arrangement can achieve an improvement in the parameters of the signal transmission from the transceiver 2 to the antenna 3 and then particularly on to a transponder. What is achieved is a signal transmission with lower losses.

In another step 104, contact is made with one of the contact points 7, 8, 9 by a connection 16, 16a, 16b being established between the first terminal 5 and one of connection points 17, 18, 19. As a result, depending on the transceiver 2 used, the connection to the contact points 7, 8, 9, which optimally adjusts the impedance of the antenna module 1 to the transceiver 2, can be selected. This contact is preferably realized by switching a switch so that contact can be realized preferably manually and/or automatically, further preferably as a function of the impedance of the antenna 3 and the transceiver 2, even further preferably, as a function of the impedance of the antenna 3 and a transponder.

The above-described exemplary embodiments are merely examples which in no way limit the protective scope, application or design of the inventive methods and systems. Rather, the preceding description affords one skilled in the art a guideline for the implementation of at least one exemplary embodiment, whereby various modifications can be made, in particular with regard to the function and arrangement of the described components, without departing from the protective scope ensuing from the claims and equivalent feature combinations. In particular, the number of windings of the antenna can be varied in any desired manner and more or fewer contact points can be used as shown in the exemplary embodiments. The terminals can also be arranged elsewhere, in particular between the transceiver and the impedance matching device. The terminals can thereby also be designed as single lines.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. An antenna module for a RFID reader, wherein the antenna module is configured for operation with a plurality of transceivers of different impedance, and comprises:
    an antenna, implemented as a loop; and
    at least two terminals for a transceiver,
    wherein the antenna is contactable via at least a first terminal of the at least two terminals along at least two different contact points spaced apart from each other on the antenna along a conductor loop of the antenna,
    wherein the transceiver is selectively connectable via the first terminal to one of the at least two contact points as a function of the impedance of the respective transceiver and/or the impedance of a RFID transponder to be read,
    wherein all elements of the antenna module are arranged on a circuit board, and
    wherein the circuit board further comprises a mounting site for the transceiver.

2. The antenna module of claim 1, further comprising:
    an impedance matching device connected on one side to the at least two terminals and connectable on another side to the transceiver.

3. The antenna module of claim 2, further comprising:
    a switch which enables switching between the at least two contact points.

4. The antenna module of claim 1, further comprising:
    a switch which enables switching between the at least two contact points.

5. The antenna module of claim 1, wherein the antenna is implemented as a coil.

6. A RFID reader, comprising:
    the antenna module of claim 1, and
    a transceiver connected to one of the at least two contact points of the antenna module.

7. The RFID reader of claim 6, wherein the antenna module further comprises:
    an impedance matching device connected on one side to the at least two terminals and connectable on another side to the transceiver.

8. The RFID reader of claim 7, wherein the antenna module further comprises:
    a switch which enables switching between the at least two contact points.

9. A method for assembling a RFID reader, comprising:
    providing the antenna module of claim 2;
    providing a transceiver;
    connecting the transceiver to at least one of the at least two terminals and the impedance matching device; and
    contacting at least one of the at least two contact points.

10. The method of claim 9, wherein the step of contacting further comprises switching a switch.

* * * * *